United States Patent
Han et al.

(10) Patent No.: US 6,985,187 B2
(45) Date of Patent: Jan. 10, 2006

(54) MOTION-ADAPTIVE INTERPOLATION APPARATUS AND METHOD THEREOF

(75) Inventors: Dong Il Han, Seoul (KR); Chang Yong Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 10/059,173

(22) Filed: Jan. 31, 2002

(65) Prior Publication Data

US 2002/0130969 A1 Sep. 19, 2002

(30) Foreign Application Priority Data

Feb. 1, 2001 (KR) .................................. 2001-4883

(51) Int. Cl.
*H04N 7/01* (2006.01)
(52) U.S. Cl. ...................................... 348/452
(58) Field of Classification Search ................ 348/448, 348/451, 452, 441, 449, 699
See application file for complete search history.

(56) References Cited

U.S. PATENT DOCUMENTS

| 4,876,596 | A |   | 10/1989 | Faroudja ..................... 358/140 |
|-----------|---|---|---------|---------------------------------------|
| 5,475,438 | A | * | 12/1995 | Bretl ........................... 348/452 |
| 5,488,430 | A | * | 1/1996  | Hong ........................... 348/699 |
| 5,546,130 | A |   | 8/1996  | Hackett et al. ............. 348/447 |
| 5,550,592 | A |   | 8/1996  | Markandey et al. ........ 348/448 |
| 5,563,651 | A |   | 10/1996 | Christopher et al. .......... 348/97 |
| 5,583,575 | A | * | 12/1996 | Arita et al. ................. 348/451 |
| 5,596,371 | A |   | 1/1997  | Pakhchyan et al. ......... 348/452 |
| 5,689,301 | A |   | 11/1997 | Christopher et al. .......... 348/97 |
| 5,793,435 | A | * | 8/1998  | Ward et al. ................. 348/448 |
| 5,943,099 | A | * | 8/1999  | Kim ........................... 348/448 |
| 6,104,439 | A | * | 8/2000  | Jeong et al. ................ 348/699 |
| 6,118,489 | A | * | 9/2000  | Han et al. ................... 348/452 |
| 6,285,711 | B1| * | 9/2001  | Ratakonda et al. ..... 375/240.16 |
| 6,414,719 | B1| * | 7/2002  | Parikh ........................ 348/448 |
| 6,430,223 | B1| * | 8/2002  | Lim ..................... 375/240.16 |
| 6,438,170 | B1| * | 8/2002  | Hackett et al. ........ 375/240.16 |
| 6,577,345 | B1| * | 6/2003  | Lim et al. ................... 348/452 |
| 6,594,313 | B1| * | 7/2003  | Hazra et al. ........... 375/240.16 |
| 6,731,342 | B2| * | 5/2004  | Shin et al. .................. 348/452 |
| 2002/0025077 | A1| * | 2/2002 | De Haan et al. ............ 382/238 |
| 2002/0131502 | A1| * | 9/2002 | Monro et al. .......... 375/240.16 |

* cited by examiner

*Primary Examiner*—Paulos M. Natnael
(74) *Attorney, Agent, or Firm*—Fleshner & Kim, LLP

(57) ABSTRACT

A motion-adaptive interpolation apparatus and method are disclosed. After an image signal is received and horizontal directional inter-frame motion information of a field to be currently interpolated is estimation, and interpolating is suitably performed based on the motion information. According to one aspect of the present invention, a basic unit image region is set for a pizel to be interpolated, a block matching error (BME) is obtained by moving the basic unit image region at certain intervals in a different direction, a linear interpolated pixel value is detected in consideration of the block matching error, and a final interpolation value is calculated and outputted by applying a rule and filtering based on the linear interpolated pizel value. Thus, a picture quality is improved after de-interlacing, and a circuit for implementation of the operation is simplified, so that a unit cost can be reduced.

19 Claims, 4 Drawing Sheets

FIG. 4

```
IF(BME_temporal < BME_spatial) then
    IF{min(p(i+1,j,n),p(i-1,j,n))≤p_temporal (i,j,n)≤max(p(i+1,j,n),p(i-1,j,n))} then
        p_moving (i,j,n)=p_temporal (i,j,n)
    ELSE IF{min(p(i+1,j-α/2,n),p(i-1,j+α/2,n))≤p_temporal (i,j,n)≤max(p(i+1,j-α/2,n),p(i-1,j+α/2,n))} then
        IF(α<δ) then
            p_moving (i,j,n)=p_temporal (i,j,n)
        ELSE
            p_moving (i,j,n)=Median{p(i-1,j,n),p_temporal (i,j,n),p(i+1,j,n)}
        END IF
    ELSE
        median_pixel=Median{p(i,j-K/2,n-1),p_temporal (i,j,n),p(i,j+K/2,n+1),p(i+1,j-α/2,n),p(i-1,j+α/2,n)}
        mean_pixel=(median_pixel+p_spatial (i,j,n))/2
        p_moving (i,j,n)=Median{p(i-1,j,n),mean_pixel,p(i+1,j,n)}
    END IF
ELSE
    IF{min(p(i+1,j,n),p(i-1,j,n))≤p_spatial (i,j,n)≤max(p(i+1,j,n),p(i-1,j,n))} then
        median_pixel=Median{p(i,j-K/2,n-1),p_spatial (i,j,n),p(i,j+K/2,n+1),p(i+1,j-α/2,n),p(i-1,j+α/2,n)}
        mean_pixel=(median_pixel+p_spatial (i,j,n))/2
    ELSE IF{min(p(i+1,j,n),p(i-1,j,n))≤p_temporal (i,j,n)≤max(p(i+1,j,n),p(i-1,j,n))} then
        median_pixel=Median{p(i,j-K/2,n-1),p_temporal (i,j,n),p(i,j+K/2,n+1),p(i+1,j-α/2,n),p(i-1,j+α/2,n)}
        mean_pixel=(median_pixel+p_temporal (i,j,n))/2
    ELSE IF{min(p(i+1,j-α/2,n),p(i-1,j+α/,n)≤p_temporal (i,j,n)≤max(p(i+1,j-α/2,n),p(i-1,j+α/2,n))} then
        median_pixel=Median{p(i,j-K/2,n-1),p_temporal (i,j,n),p(i,j+K/2,n+1),p(i+1,j-α/2,n),p(i-1,j+α/2,n)}
        mean_pixel=(median_pixel+p_spatial (i,j,n))/2
    ELSE
        median_pixel=Median{p(i,j,n-1),p_spatial (i,j,n),p(i,j,n+1),p(i+1,j-α/2,n),p(i-1,j+α/2,n)}
        mean_pixel=(median_pixel+p_spatial (i,j,n))/2
    END IF
    IF(α<δ) then
        p_moving (i,j,n)=mean_pixel
    ELSE
        p_moving (i,j,n)=Median{p(i-1,j,n),mean_pixel,p(i+1,j,n)}
    END IF
END IF
```

MOTION-ADAPTIVE INTERPOLATION APPARATUS AND METHOD THEREOF

BACKGROUND OF THE INVENTION

1. Field of the Invention

The present invention relates to a de-interlacing of an image sequence, and more particularly, to a motion-adaptive interpolation apparatus and method for accurately performing a de-interlacing.

2. Description of the Related Art

In general, an interlaced scan method has an advantage that a resolution in a vertical direction can be doubled even without raising a refresh rate of a screen, so that the resolution can be effectively improved with a limited frequency band.

However, the interlaced scan method has a disadvantage that it causes a screen jitter or a line crawl phenomenon that the screen moves up and down slowly.

Especially, in a still picture without a motion, the trembling of screen is very unpleasant to a user. A progressive scan method has been introduced to solves this problem.

For example, the NTSC interlaced scan method is performed by scanning an electron beam 60 times a second over the entire screen having 525 lines, whereby the electron beam is scanned 30 times to create 262.5 even lines, and remaining 30 times to create 262.5 odd lines. Accordingly, in terms of fields, 60 fields are reproduced in 1 second, while in terms of frames, 30 frames are reproduced in 1 second. On the other hand, the progressive scan method reproduces 60 frames in a second by scanning 525 scan lines at once.

A technique for converting an image sequence of an interlaced scan method to an image sequence of a progressive scan method is called a de-interlacing technique.

Conventional de-interlacing techniques are disclosed in U.S. Pat. No. 4,876,596 (Film-to-video converter with scan line doubling: Faroudja), U.S. Pat. No. 5,550,592 (Film mode progressive scan conversion; Markandey et al.), U.S. Pat. No. 5,563,651 (Method and apparatus for identifying video fields produced by film sources employing 2—2 and 3-2 pull down sequences; Christopher et al.), U.S. Pat. No. 5,596,371 (Film-mode video line-doubler motion detectors; Pakhchyan et al.), U.S. Pat. No. 5,689,301 (Method and apparatus for identifying video fields produced by film sources; Christopher et al.). Interpolation methods of the above techniques can be summarized by five methods as follows.

A first method is to interpolate by repeatedly using line information of the current field itself.

A second method is an interfield interpolation method that a very previous field data is inserted as it is between the current field line data without performing a motion compensation.

A third method is an intrafield interpolation method for interpolating by using a linear line interpolation of the current field itself.

A fourth method is a motion compensation interpolation method for interpolating by searching a motion vector.

A fifth method is a motion-adaptive interpolation method for interpolating based upon a motion by estimating a motion amount.

The first to third interpolation methods can be implemented by a simple hardware, but its picture quality is degraded after interpolation.

Referring to the fourth interpolation method, a picture quality is improved after interpolation, but its hardware construction is considerably complicated.

Meanwhile, the fifth method is implemented with a comparatively simple hardware, and its picture quality is improved after interpolation.

However, even if the fifth interpolation method is adopted, in case that only the motion between frames is detected, a motion of an object moving instantly or an object moving at a certain speed is hardly detected. In addition, even in case that a motion between simple fields is detected; it causes an excessive motion detection. Because of such an excessive motion, a resolution of an image after interpolation is degraded and overall picture quality is also degraded.

Accordingly, in order to more accurately detect a motion of an object, a plurality of memory units or a complicated processing procedure is required. It is inevitable that a complicated structure of the overall hardware is required and a manufacturing expense of a circuit for the construction is increased.

SUMMARY OF THE INVENTION

Accordingly, the present invention is directed to a motion-adaptive interpolation apparatus and a method therefore that substantially obviates one or more problems due to limitations and disadvantages of the related art.

One object of the present invention is to provide a motion-adaptive interpolation method that is capable of improving a picture quality after interpolation by performing a suitable compensation according to motion information.

Another object of the present invention is to provide a motion-adaptive interpolation apparatus that is capable of improving a picture quality with a simple hardware structure compared to an existing device.

To achieve these and other advantages and in accordance with the purpose of the present invention, as embodied and broadly described herein, there is provided a motion-adaptive interpolation apparatus and method in which horizontal directional motion information of a field to be currently interpolated is accurately estimated from information of past fields and future fields on the basis of the field to be currently interpolated, and a suitable interpolation is performed according to the estimated motion information.

According to one aspect of the present invention, there is further provided a motion-adaptive interpolation apparatus including: a horizontal directional motion estimating means for receiving a continuous field data and setting a basic unit image region by estimating a horizontal directional motion, obtaining a block matching error (BME) by moving the basic unit image region at certain intervals in a horizontal direction of mutually opposite direction, and detecting a linearly interpolated pixel value by using the block matching error and outputting the detected pixel value; and a line interpolating means for calculating a final interpolation value by using a rule and a filtering by using the linearly interpolated pixel value and outputting the final interpolation value.

According to another aspect of the present invention, there is provided a motion-adaptive interpolation method including: receiving an image signal and outputting a continuous field data; receiving the field data and estimating and outputting horizontal directional inter-frame motion information of a field to be currently interpolated; and calculating a line interpolation value by applying a rule and filtering based upon the estimated motion information.

The foregoing and other objects, features, aspects and advantages of the present invention will become more apparent from the following detailed description and appended claims of the present invention, taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is an exemplary view of a rule adopted for outputting a final interpolation value and a filtering algorithm in accordance with the preferred embodiment of the present invention.

DETAILED DESCRIPTION OF THE PREFERRED EMBODIMENTS

Figure 1:
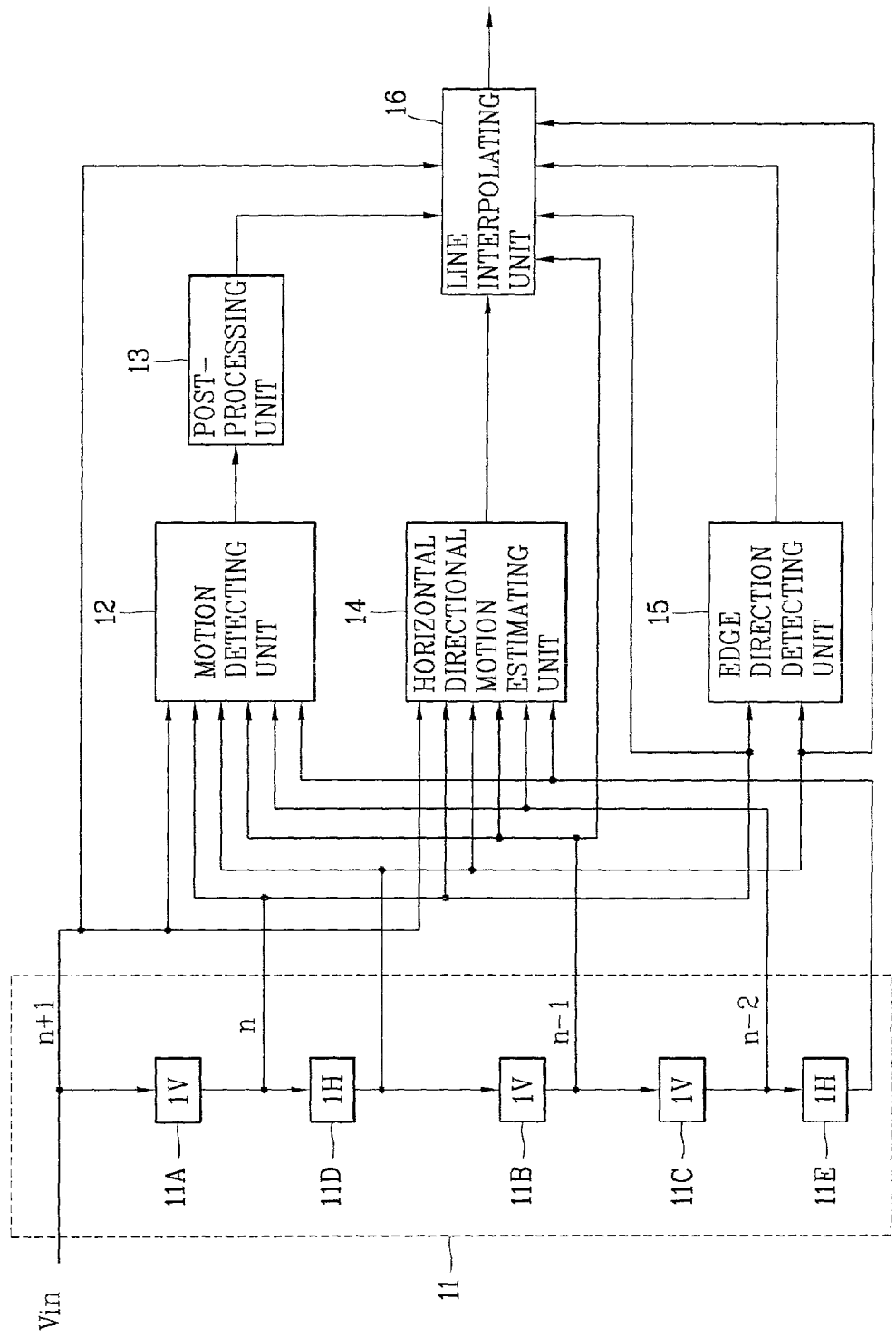
FIG. 1 is a block diagram of a motion-adaptive interpolation apparatus in accordance with a preferred embodiment of the present invention.

The following detailed description of the embodiments of the present invention, as represented in FIGS. 1–4, is not intended to limit the scope of the invention, as claimed, but is merely representative of the presently preferred embodiments of the invention. In the description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a block diagram of a motion-adaptive interpolation apparatus in accordance with a preferred embodiment of the present invention.

As shown in FIG. 1, a motion-adaptive interpolation apparatus of the present invention includes: a field data providing unit 11 for receiving an input image signal (Vin), and storing or outputting a continuous field data; a motion detecting unit 12 for receiving the continuous field data and detecting an inter-frame motion amount and a inter-field motion amount; a post processing unit 13 for filtering the detected motion and extending the filtered signal to output a precise motion amount value; a horizontal directional motion estimating unit 14 for receiving the field data to estimate a horizontal directional motion and set a basic unit image region, obtaining a block matching error (BME) by moving the basic unit image region at certain intervals in a horizontal direction of the mutually opposite direction, and detecting a linearly interpolated pixel value and outputting the pixel value; an edge direction detecting unit 15 for receiving the field data, estimating a direction of edges of a field image to be interpolated, and performing an interpolation according to the direction; and a line interpolating unit 16 for receiving output information of the post-processing unit, the horizontal direction motion estimating unit and the edge direction detecting unit, and obtaining a final interpolation value by using a rule and filtering in consideration of an influence of the block matching error value and the pixel value used for the temporal motion compensation.

The operation of the motion-adaptive interpolation apparatus constructed as described above will now be explained.

The field data providing unit 11 sequentially stores the input image signal (Vin) and provides four pieces of field data for a motion detection and interpolation, by using a three serially connected field memory units 11A~11C and line memory units 11D and 11E The motion detecting unit 12 includes an inter-frame motion detecting unit for receiving data of four continuous fields, that is, one piece of reference (current) field (n), two pieces of previous (past) field (n−1) and (n−2) and one piece of post (future)–field (n+1), and detecting a motion amount between fields existing at the same phase at time intervals of one frame or a plurality of frames; and an inter-field motion detecting unit for detecting a motion between fields existing at different phases at time intervals of one field.

The post-processing unit 13 performs various functions to detect a precise motion amount. That is, for reliable motion detection, the post-processing unit 13 low-pass filters a bright difference signal outputted from the motion detecting unit 12 and maps the filtered brightness difference signal to a level determined for motion amount discrimination.

And then, in order to group the portion with motion, the post-processing unit 13 median-filters the mapped brightness difference signal, extends the filtered signal and outputs a precise motion amount value.

The edge direction detecting unit 15 estimates a direction of edges of the field image to be interpolated and allows interpolation according to the interpolation.

The horizontal directional motion detecting unit 14 detects inter-frame motion information of the field data, precisely estimates a horizontal directional motion from the motion information, and allows a temporal compensation even if there is a motion in the direction.

The operation of the horizontal directional motion detecting unit 14 will now be described.

Figure 2:
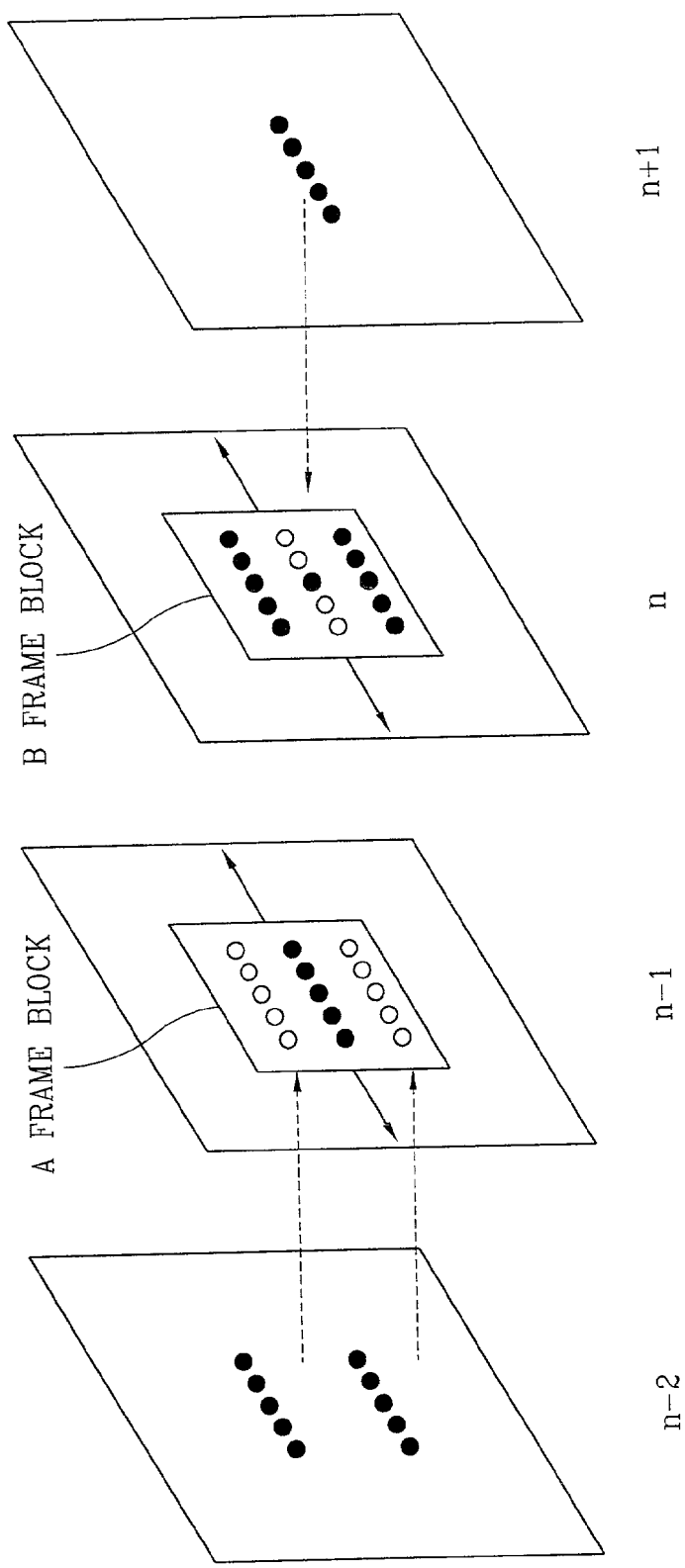
FIG. 2 is an exemplary view of an image field and a frame block for a horizontal directional motion estimation and interpolation in accordance with the preferred embodiment of the present invention.

FIG. 2 is an exemplary view of an image field and a frame block for a horizontal directional motion estimation and interpolation in accordance with the preferred embodiment of the present invention.

As shown in FIG. 2, two lines of the (n−2)th field and one line of the (n−1)th field used for a motion detection in the horizontal directional motion detecting unit 14 are combined to form one frame image block ('A' frame block), and two lines of the nth field and one line of the (n+1)th field to form a different frame image block (B' frame block), to thereby set a basic unit image region for the 'A' frame block and 'B' frame block on the basis of pixels to be currently interpolated.

At this time, the number of pixels in the vertical direction of the basic unit image region as set is '3', and the number of pixels in the horizontal direction may be variably set according to an applied method.

That is, an image region of a basic unit for a motion estimation is 3×N (the number of vertical directional pixels×the number of horizontal directional pixels).

And then, a block matching error (BME) is obtained by moving the basic unit image region at certain intervals in the horizontal direction of the mutually opposite direction.

At this time, a movement interval of the basic unit image region may be variably set according to application, and generally, a movement interval of ¼~1 pixel is mostly used.

The process of the block matching is continuously performed with a unit of pixel to be currently interpolated, which can be expressed in the following expression (1).

$$BME(i, j, k) = 1/(3 \times N) \sum_{a=-1}^{1} \sum_{b=-(N-1)/2}^{(N-1)/2} |p(i+a, j+b-k/2, n-1) - p(i+a, j+b+k/2, n+1)| \quad (1)$$

In this respect, with reference to FIG. 2, the pixel to be interpolated is one in the j-th position in a vertical direction and j-th position in a horizontal direction of the nth field, and 'k' is a horizontal directional movement interval between the basic unit image regions on the basis of the pixel to be currently interpolated.

Accordingly, the BME (i, j, k) indicates a block matching error (BME) according to the 'k', the horizontal directional interval of the pixel to be currently interpolated.

Thereafter, a BME having a minimum value is selected from BMEs obtained as described above for each pixel to be interpolated. And, the BME with the minimum value, the temporally linear-interpolated value according to the direction according to the position of the pixel to be currently interpolated, and the pixel values of the previous and the next fields used for the linear interpolation are outputted to the line interpolating unit.

In this respect, if the BME has a minimum value in the 'K' movement interval, a temporally linear-interpolated pixel value in this direction can be expressed by equation (2):

$$P_{temporal}(i,j,n)=(p(i,j-k/2,n-1)+p(i,j+k/2,n+1))/2 \quad (2)$$

Therefore, in the motion estimating method of the present invention, since the motion is estimated for an image with a horizontal directional motion without additionally installing hardware such as a memory unit, a picture quality can be improved without adding hardware compared to the conventional motion-adaptive interlacing method.

Figure 3:
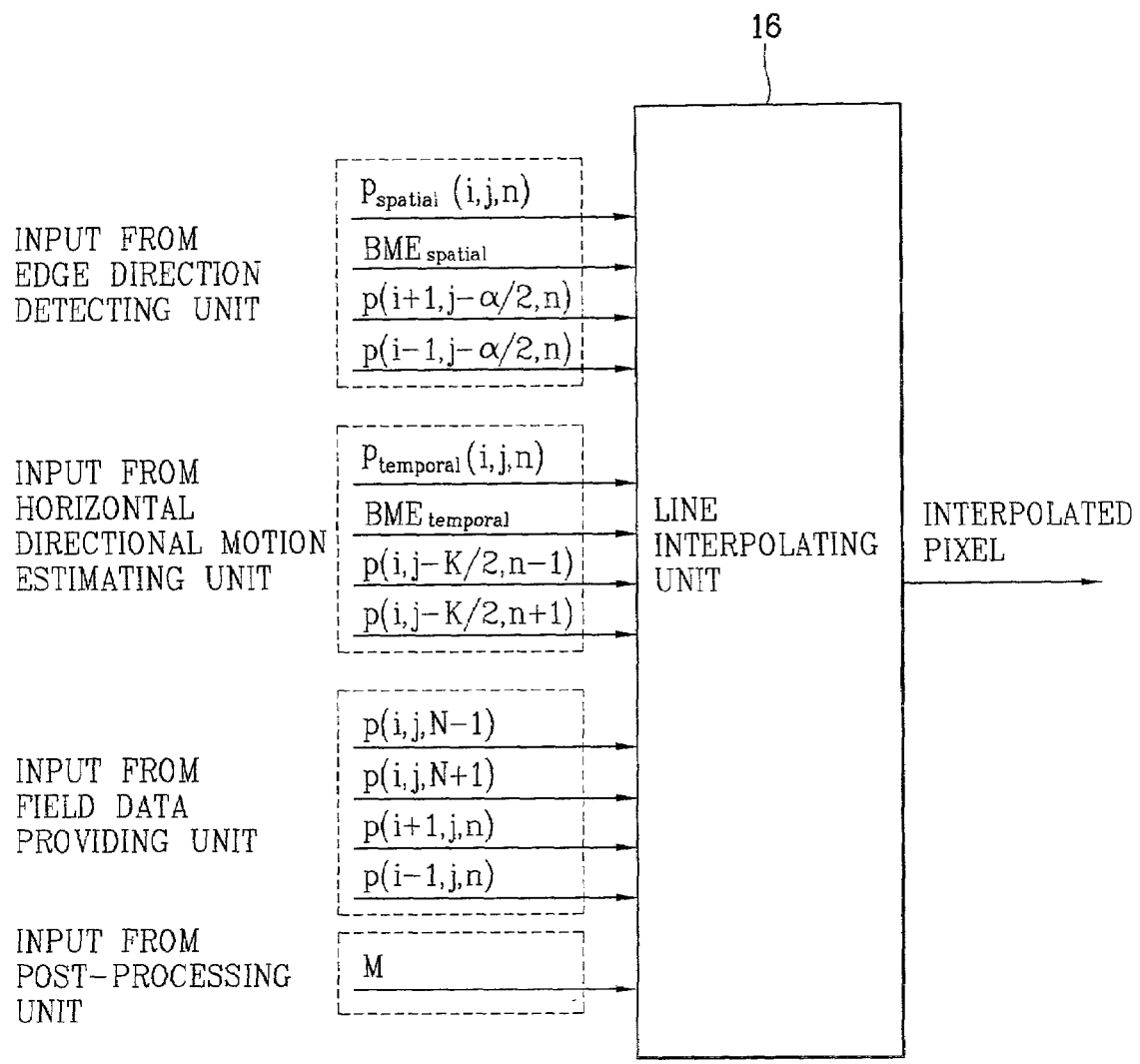
FIG. 3 is an exemplary view of an input data of a line interpolating unit in accordance with the preferred embodiment of the present invention.

FIG. 3 is an exemplary view of an input data of a line interpolating unit in accordance with the preferred embodiment of the present invention.

As shown in FIG. 3, a data value inputted to the line interpolating unit 16 includes a motion amount value (M), an output of the post-processing unit 13; a pixel positioned at a very upper side (p(i−1), j, n)), the output of the field data providing unit 11, and a lower side (p(i+1, j, n)) of the pixel to be currently interpolated spatially, and a pixel of the previous (p(i, j, n−1) and next (p(i, j, n+1) fields existing at the same position spatially as that of the pixel being currently interpolated; spatial linear interpolation value ($P_{spatial}$(i, j, n)), the output of the edge direction detecting unit 15, according to an edge direction as the below equation (3), the then spatial block matching error ($BME_{spatial}$), and pixels (p(i+1, j−a/2, n), p(i−1, j+a/2, n)) used for the spatial linear interpolation;

$$P_{spatial}(i,j,n)=(p(i+1,j-\alpha/2,n)+p(i-1,j+\alpha/2,n))/2; \quad (3)$$

and a temporally motion-compensated interpolation value ($P_{temporal}$(i, j, n)), the output of the horizontal directional motion estimating unit 14, and the then temporal block matching error ($BME_{spatial}$), and pixel values (p(i, j−k/2, n−1), p(i, j+k/2, n+1) used for the temporal motion compensation.

Thus, the line interpolating unit 16 receives the output values, applies a rule and a filtering, calculates an interpolation value ($P_{moving}$(i, j, n)), and outputs a final line interpolated pixel value $P_{interpolating}$(i, j, n).

FIG. 4 is an exemplary view of a rule adopted for outputting a final interpolation value and a filtering algorithm in accordance with the preferred embodiment of the present invention.

The rule and filtering as shown in FIG. 4 shows one example, and the interpolation value calculation method in the line interpolating unit 16 is not limited thereto.

The concept of the rule and filtering will now be described.

In case of accurate motion estimation, temporal motion compensation is performed. In case of vague motion estimation, a pixel value blended according to temporal motion estimation and spatial edge direction estimation is used. Meanwhile, in case of inaccurate motion estimation, a pixel value interpolated according to spatial edge direction estimation is used.

Accordingly, a suitable filtering can be performed according to a slope in the estimated edge direction.

Consequently, a line interpolation pixel value ($P_{interpolating}$(i, j, n)) to be finally obtained is expressed by below equation (5):

$$P_{stationary}(i, j, n) = (p(i, j, n-1) + p(i, j, n+1))/2 \quad (4)$$

$$P_{interpolating}(i, j, n) = (1-M) \cdot p_{stationary}(i, j, n) + M \cdot P_{moving}(i, j, n), \quad (5)$$
$$(0 \leq M \leq 1)$$

wherein, $P_{stationary}$(i, j, n) is a pixel value of stationary interpolation, $P_{moving}$(i, j, n) is a pixel value of moving interpolation, and 'M' is a motion amount value, the output of the post-processing unit.

As so far described, the motion-adaptive interpolation apparatus and method of the present invention has the following advantages.

That is, after an image signal is received, horizontal directional inter-frame motion information of a field to be currently interpolated is estimated, and interpolating is suitably performed according to the motion information. Thus, a picture quality is improved after de-interlacing, and a circuit for implementation of the operation is simplified, so that a unit cost can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A motion-adaptive interpolation method comprising:
receiving a continuous field data;
estimating horizontal directional inter-frame motion information of a field to be currently interpolated and outputting the estimated motion information;
calculating and outputting a line interpolation value by applying a rule and filtering according to the estimated motion information, wherein the estimating horizontal directional inter-frame motion information is obtaining a block matching error (BME) by moving the basic unit image region at certain intervals in a horizontal direction of mutually opposite directions;

receiving an input image signal, and storing and outputting a field data;

receiving the field data, detecting and outputting an inter-field motion amount value and inter-frame motion amount value;

improving a reliability of the detected motion and outputting a motion amount value; and estimating an edge direction of a field image to be currently interpolated.

2. The method of claim 1, wherein the continuous field data includes two past field data, one current field data and one future field data.

3. The method of claim 1, wherein the step of estimating horizontal directional motion information of a field further comprises:

outputting a temporally linear-interpolated value according to a direction corresponding to a position of a pixel to be currently interpolated and pixel values of an adjacent field including a previous pixel and a next pixel used for the linear interpolation, by using the block matching error having a minimum value for each pixel to be interpolated.

4. The method of claim 3, wherein the line interpolation value is calculated in a manner that the block matching error, the linear-interpolated value and the previous and next pixel values used for the linear interpolation are received and a final interpolation value is calculated by using a rule and filtering, and then a line interpolation is performed by using the calculated value.

5. The method of claim 3, wherein a step of setting a basic unit image region comprises:

combining the field data with adjacent field data to form two frame image blocks.

6. The method of claim 3, wherein, in a step of setting a basic unit image region, a continuous field data is received to detect interframe motion information, and the horizontal directional motion is estimated from the motion information to set the basic unit image region.

7. The method of claim 3, the number of pixels of the basic unit image region is the number of vertical directional pixels×the number of horizontal directional pixels, wherein the number of the vertical directional pixels is 3 and the number of horizontal directional pixels are variably set by a user.

8. The method of claim 1, wherein the rule and filtering are performed in a manner that:

in case of an accurate motion estimation, a temporal motion compensation is performed, in case of a vague motion estimation, a pixel value blended according to a temporal motion estimation and spatial edge direction estimation is used to be performed; and in case of an inaccurate motion estimation, a pixel value interpolated according to a spatial edge direction estimation is performed and a filtering is performed according to a slope of the estimated edge direction.

9. A motion-adaptive interpolation apparatus comprising:

a horizontal directional motion estimating means for receiving a continuous field data and setting a basic unit image region by estimating a horizontal directional motion, obtaining a block matching error (BME) by moving the basic unit image region at certain intervals in a horizontal direction of mutually opposite direction, and detecting a linear-interpolated pixel value by using the block matching error and outputting the detected pixel value; and a line interpolating means for receiving an output value from the horizontal directional motion estimating means and calculating a final interpolation value, wherein the linearly interpolated pixel value includes a temporally motion compensated interpolation value as the output of the horizontal directional motion estimating means, a temporal block matching error at that time, and previous and next pixel values used for the temporal motion compensation.

10. The apparatus of claim 9, wherein the field data includes two past fields, one current field and one future field.

11. The apparatus of claim 9, wherein the basic unit image region detects inter-frame motion information of the field data and estimates a horizontal directional motion from the motion information.

12. The apparatus of claim 9, wherein the number of pixels of the basic unit image region is the number of vertical directional pixels×the number of horizontal directional pixels, wherein the number of the vertical directional pixels is 3 and the number of horizontal directional pixels are variably set by a user.

13. The apparatus of claim 9, further comprising:

a motion detecting means for receiving the continuous field data and detecting an inter-frame motion amount and an inter-field motion amount;

a post-processing means for filtering the detected motion amount and outputting a precise motion amount value by extending the filtered signal; and an edge direction detecting means for receiving the continuous field data, estimating a direction of edges of the field image to be interpolated, and performing an interpolation according to the direction.

14. The apparatus of claim 13, wherein, in detecting the inter-frame motion amount, a motion amount between fields existing at the same phase with temporal intervals of one frame or of a plurality of frames from the field data, and in detecting the inter-field motion amount, a motion amount between fields existing at different phases with temporal interval of one field from the field data.

15. The apparatus of claim 13, wherein the filtered signal is a signal obtained in a manner that, a brightness difference signal outputted from the motion detecting means is low-pass filtered, the filtered signal is mapped to a predetermined level, and the mapped signal is median-filtered.

16. The apparatus of claim 13, wherein the line interpolating means receives output information of the post-processing means, the horizontal directional motion estimating means and the edge direction detecting means, and obtains a final interpolation value in consideration of the influence of the block matching error value and the pixel value used for the temporal motion compensation.

17. A motion-adaptive interpolation apparatus comprising:

a field data providing means for receiving an input image signal and storing and outputting field data;

a motion detecting means for receiving the continuous field data from the field data providing means and detecting an inter-field and inter-frame motion amount;

a post-processing means for improving a reliability of the detected motion;

a horizontal directional motion estimating means for estimating a motion in a horizontal direction, obtaining a block matching error by moving a basic unit image region for a motion estimation at certain intervals in a different horizontal direction in order to perform a temporal compensation for a case that there is a motion in the direction, and detecting a linear-interpolated pixel value;

an edge direction detecting means for receiving a field data and a horizontal line data from the field data providing means and detecting an edge direction; and a line interpolating means for receiving output information of the post-processing means, the horizontal directional motion estimating means and the edge direction detecting means, and obtaining a final interpolation value by using a rule and filtering in consideration of an influence of a block matching error value and a pixel value used for a temporal motion compensation, wherein the data value inputted for the rule and filtering includes spatial linear interpolation value according to the edge direction obtained from the edge direction detecting means, a spatial block matching error at that time, and pixels used for a spatial linear interpolation; and temporal motion compensated interpolation value obtained from the horizontal directional motion estimating means, a temporal block matching error at that time, and a pixel value used for a temporal motion compensation.

18. The apparatus of claim 17, wherein the data value inputted for the rule and filtering further includes:
   a motion amount value obtained from the post-processing means; and
   a pixel spatially positioned at a very upper and a very lower side of the pixel to be currently interpolated and pixels of a previous and next fields existing spatially at the same position as that of the pixel being currently interpolated, both obtained from the field data providing means.

19. A motion-adaptive interpolation method comprising:

receiving a continuous field data, estimating horizontal directional inter-frame motion information of a field to be currently interpolated and outputting the estimated motion information;

calculating and outputting a line interpolation value by applying a rule and filtering according to the estimated motion information receiving an input image signal, and storing and outputting a field data;

receiving the field data, detecting and outputting an inter-field motion amount value and inter-frame motion amount value;

improving a reliability of the detected motion and outputting a motion amount value; and estimating an edge direction of a field image to be currently interpolated, wherein the rule and filtering are performed in a manner that:

in case of an accurate motion estimation, a temporal motion compensation is performed, in case of a vague motion estimation, a pixel value blended according to a temporal motion estimation and spatial edge direction estimation is used to be performed; and in case of an inaccurate motion estimation, a pixel value interpolated according to a spatial edge direction estimation is performed and a filtering is performed according to a slope of the estimated edge direction.

* * * * *